United States Patent [19]
Kim

[11] Patent Number: 5,730,092
[45] Date of Patent: Mar. 24, 1998

[54] SYSTEM FOR CHANGING LIFT OF A VALVE

[75] Inventor: Gyu-Wan Kim, Seoul, Rep. of Korea

[73] Assignee: Hyundai Motor Company, Seoul, Rep. of Korea

[21] Appl. No.: 764,219

[22] Filed: Dec. 13, 1996

[30] Foreign Application Priority Data

Dec. 15, 1995 [KR] Rep. of Korea ............ 95-50615/1995

[51] Int. Cl.⁶ .................................................. F01L 13/00
[52] U.S. Cl. ............................. 123/90.15; 123/90.19; 123/188.6; 123/188.8; 123/188.9
[58] Field of Search .................... 123/90.12, 90.15, 123/90.19, 188.1, 188.2, 188.6, 188.8, 188.9

[56] References Cited

U.S. PATENT DOCUMENTS

| | | | |
|---|---|---|---|
| 2,631,577 | 3/1953 | Carter | 123/188.8 |
| 3,911,875 | 10/1975 | Ysberg | 123/188.2 |
| 4,164,957 | 8/1979 | Goloff | 123/188.9 |
| 4,187,807 | 2/1980 | Cemenska et al. | 123/188.9 |
| 5,351,662 | 10/1994 | Dopson et al. | 123/90.16 |
| 5,531,193 | 7/1996 | Nakamura | 123/90.15 |

FOREIGN PATENT DOCUMENTS

| | | | |
|---|---|---|---|
| 69714 | 3/1989 | Japan | 123/188.9 |

*Primary Examiner*—Weilun Lo
*Attorney, Agent, or Firm*—Finnegan, Henderson, Farabow, Garrett & Dunner, L.L.P.

[57] ABSTRACT

A valve system for an internal combustion engine includes a valve member having a head and a stem extending from the head, a seal ring on the valve member head, the seal ring being movable along an axis of the valve member and being capable of forming a seal with a valve seat of the engine, and an adjustment device on the valve member for moving the seal ring along the axis of the valve member to change lift of the valve member. The adjustment device moves the seal ring in response to temperature changes.

15 Claims, 2 Drawing Sheets

SYSTEM FOR CHANGING LIFT OF A VALVE

BACKGROUND OF THE INVENTION

1. Field of the Invention

The present invention relates to a system for changing lift of a valve in an internal combustion engine. More particularly, the present invention relates to an apparatus for adjusting valve lift in an automobile engine according to the operating range of the engine to thereby provide substantially ideal combustion and improve engine output.

2. Description of Related Art

In a conventional automobile engine, an air-fuel mixture enters a plurality of cylinders and is detonated to reciprocate a plurality of pistons. A crank mechanism transforms the reciprocating motion of the pistons into rotary motion transmitted to the driving wheels of the automobile.

The air-fuel mixture entering the combustion chamber has a great influence on the output of the engine. Various experiments have been performed in an attempt to improve engine output and reduce production of harmful gases through perfect combustion of the air-fuel mixture. For example, combustion efficiency can be improved by adjusting the extent to which an intake or exhaust valve opens (valve lift).

The conventional automobile engine includes a timing belt or chain connecting a crank shaft to a cam shaft, so that rotation of the crank shaft is transmitted to the cam shaft. In an overhead cam engine, cams on the cam shaft come in contact with stems of intake and exhaust valves disposed at each cylinder. When the cam shaft rotates, the valves open and close according to the profile of the cams to allow for respective intake of the air-fuel mixture and exhaust of combustion byproducts.

The opening and closing system for the conventional automobile engine has a significant drawback. The valve lift (degree to which the valves open to allow flow) is determined by the outer surface profile of the cams and cannot be adjusted. Therefore, the valve lift remains constant during low, medium, and high speeds of the engine. As a result, the conventional engine does not achieve maximum output during all operating ranges of the engine.

In light of the foregoing, there is a need in the art for an improved valve system for an internal combustion engine.

SUMMARY OF THE INVENTION

Accordingly, the present invention is directed to a valve system that substantially obviates one or more of the limitations of the related art. In particular, the present invention adjusts valve lift according to the operating range of an engine so that combustion and engine output are improved.

To achieve these and other advantages and in accordance with the purpose of the invention, as embodied and broadly described herein, the invention includes a valve system for an internal combustion engine, comprising a valve member having a head and a stem extending from the head; a seal ring on the valve member head, the seal ring being movable along an axis of the valve member and being capable of forming a seal with a valve seat of the engine; and means on the valve member for moving the seal ring along the axis of the valve member to change lift of the valve member.

In another aspect, the moving means moves the seal ring in response to increased temperature.

In another aspect, flow of coolant fluid into the valve member is controlled according to the speed of the engine.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
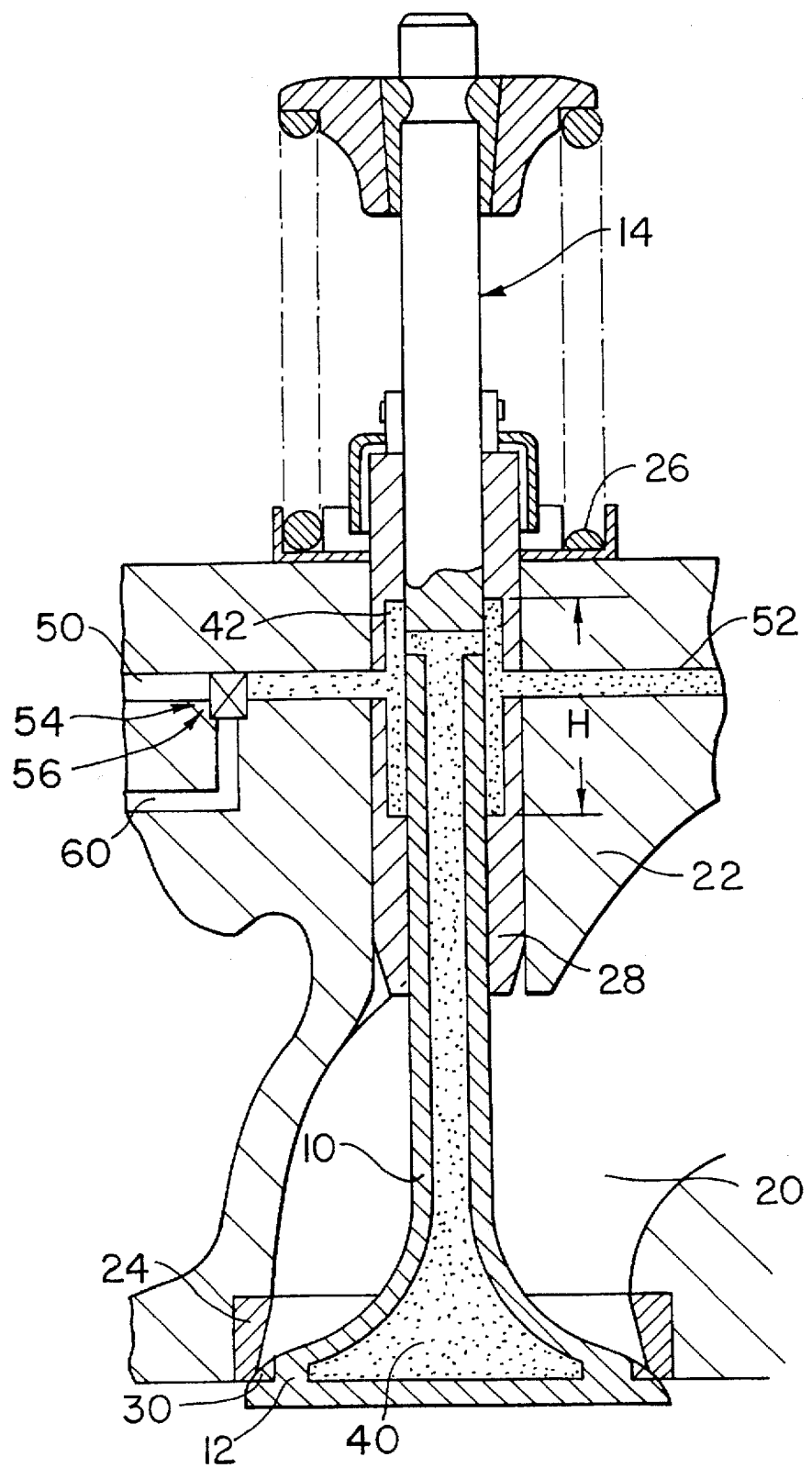
FIG. 1 is a partial cross-sectional view of an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a cross-sectional view of a valve system according to the present invention. A valve member 10 opens and closes a port 20 formed in a cylinder head 22 as it moves along its axis upwards and downwards. Preferably, the port 20 is an intake port in which an air-fuel mixture flows to a cylinder. However, the port 20 may also be an exhaust port for removing combustion by-products from the cylinder.

The valve member 10 includes a head 12 having an annular sealing 30 capable of forming a seal with a valve seat 24 formed in the cylinder head 22 and a stem 14 extending from the head 12. Preferably, a free end of the stem 14 rides on a cam of a camshaft (not shown) mounted above the cylinder head 22 so that the head 12 moves away from and towards the valve seat 24 to open and close the port 20 during rotation of the cam shaft. A valve spring 26 connected to the cylinder head 22 and the end of the stem 14 biases the valve member 12 toward the camshaft and forces the valve member 10 into its closed position. During movement, the valve member 10 is guided by a valve guide 28 positioned in the cylinder head 22 and surrounding a portion of the stem 14.

Figure 3:
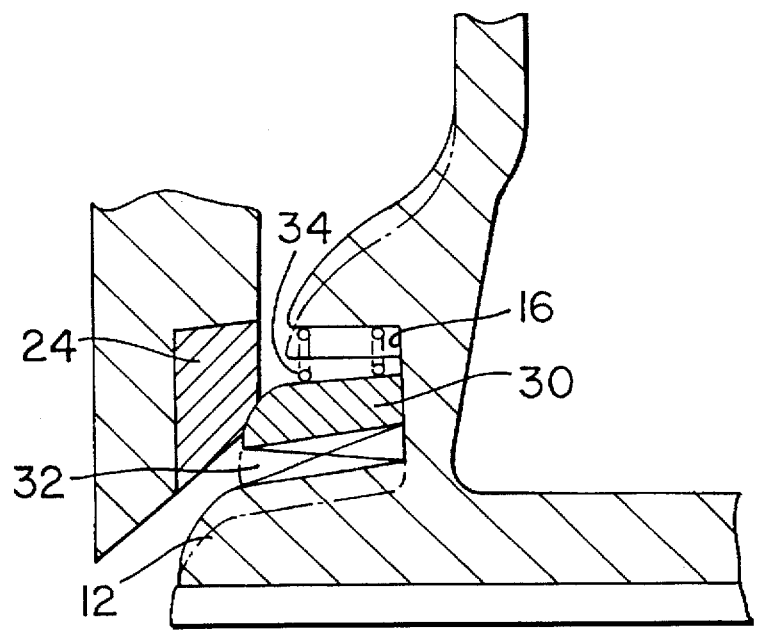
FIG. 3 is a detailed cross-sectional view of a valve seat and a head of a valve member shown in FIG. 1.

As shown in FIG. 3, the head 12 of the valve member 10 includes an outer, annular shaped, surface groove 16 containing the seal ring 30, an adjustment device 32, and a spring 34 biasing the seal ring 30 toward the adjustment device 32. The seal ring 30 is movable along an axis of the valve member 10 in the groove 16 and forms the seal with the valve seat 24. As described in more detail below, the adjustment device 32 functions to move the seal ring 30 in the direction of the axis of the valve member 10 and thereby change the lift of the valve member 10.

The adjustment device 32, which is schematically shown in FIG. 3, preferably moves the seal ring 30 in response to temperature changes. In one embodiment, the adjustment device 32 is an expandable chamber containing a substance, such as a gas or liquid, capable of expanding in response to increased temperature and contracting in response to reduced temperature. In another embodiment, the adjustment device 32 is a spring capable of expanding and contracting in response to temperature variations.

As heat is generated during combustion in a cylinder positioned beneath the valve member 10, the adjustment device 32 expands to move the seal ring 30 toward the stem 14. This decreases lift of the valve member 10 because the end of the stem 14 is positioned further away from the outer surface of a cam.

As explained below, the system also includes structure for cooling the adjustment device 32 to allow it to contract. During contraction of the adjustment device 32, the seal ring 30 moves away from the stem 14. This places the end of the stem 14 closer to the cam and thereby increases lift of the valve member 10.

The valve member 10 is formed of a thermally conductive material, such as metal, and includes an inner wall surface forming a cavity 40 in the valve member 10. The cavity 40 extends from the head 12 to a middle portion of the stem 14. The stem 14 includes an inlet and outlet placing the cavity 40 in flow communication with an annular passage 42 in the interior of the valve guide 28. The passage 42 has a vertical height "H" slightly greater than the maximum lift of valve member 10.

An inflow conduit 50 and outflow conduit 52 are formed in the cylinder head 22 and communicate with a fluid coolant system of the engine. The inflow conduit 50 carries engine coolant fluid into the passage 42 in the valve guide 28 and into the cavity 40. The coolant fluid then cools the valve member 10 and adjustment device 32, to contract the adjustment device 32 and increase valve lift. After passing into the cavity 40, the outflow conduit 52 removes the coolant fluid via the passage 42 and passes the coolant fluid into the remaining portion of the engine coolant system.

Figure 2:
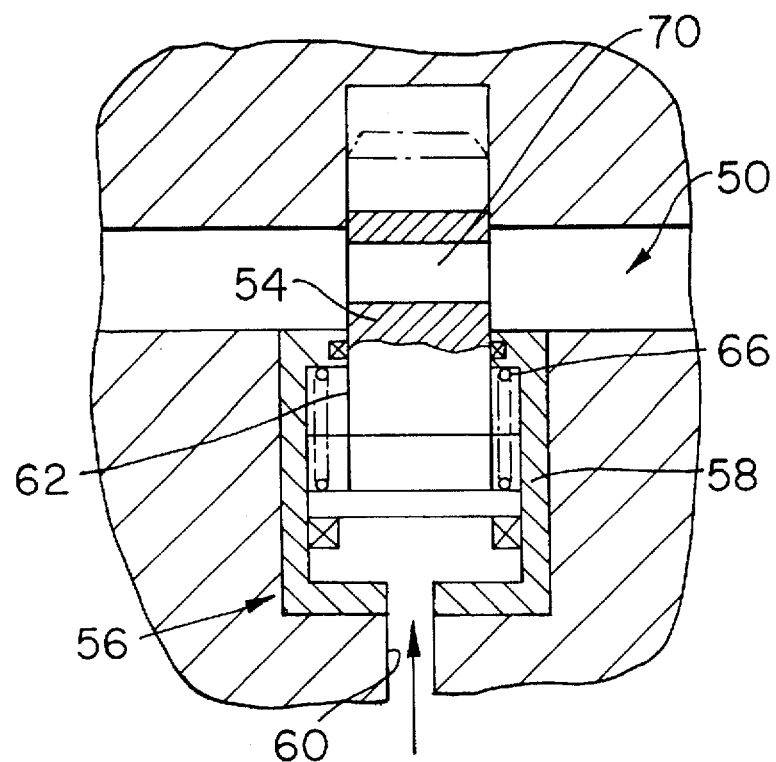
FIG. 2 is a detailed cross-sectional view of a coolant flow control valve and controller shown in FIG. 1.

As shown in FIGS. 1 and 2, a flow control valve 54 in the inflow conduit 50 controls flow of the engine coolant into the cavity 40. The flow control valve 54 includes a movable portion having a flow pathway 70. A controller 56 connected to the valve 54 controls the valve 54 based on pressure of oil in the engine.

The controller 56 includes a case 58 placed in flow communication with an oil gallery of the engine via a passage 60 in the cylinder head 22. The controller 56 also includes a piston 62 slidable in a sealed manner along an interior surface of the case 58 and a spring 66 for biasing the piston 62 toward oil stored in a portion of the case 58.

The piston 62 is connected to the flow control valve 54 so that the flow control valve 54 regulates coolant flow in response to oil pressure changes. When pressure in the oil lubrication system of the engine increases, such as when the engine operates at a relatively high speed, this increased pressure moves the piston 62 and flow control valve 54 into a position shown by dashed lines in FIG. 2 to decrease or prevent flow of coolant fluid through the inflow conduit 50. This allows the adjustment device 34 to thermally expand and move the seal ring 30 toward the stem 14, thereby decreasing lift of the valve member 10.

In contrast, when the pressure in the oil lubrication system of the engine decreases, such as when the engine operates at a relatively low speed, the spring 66 moves the piston 62 and flow control valve 54 into a position permitting flow of coolant fluid through the inflow conduit 50. The coolant fluid then flows into the cavity 40 where it cools the adjustment device 32. In response, the adjustment device 32 contracts and allows the seal ring 30 to move away from the stem 14 and increase lift of the valve member 10.

The present invention allows for control of valve lift according to engine speed and/or engine temperature. When the present system is used to control lift of an intake valve of the engine, the air-fuel mixture flowing to the cylinder is controlled to provide substantially ideal combustion and improved engine output.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A valve system for an internal combustion engine, comprising:

a valve member having a head and a stem extending from the head;

a seal ring on the valve member head, the seal ring being movable along an axis of the valve member and being capable of forming a seal with a valve seat of the engine; and means on the valve member for moving the seal ring along the axis of the valve member to change lift of the valve member.

2. The valve system of claim 1, wherein the moving means moves the seal ring in response to temperature variation.

3. The valve system of claim 2, further comprising a spring on the valve member head, the spring biasing the seal ring toward the moving means.

4. The valve system of claim 2, wherein the valve member is formed of a thermally conductive material and has an inner surface forming a cavity and an inlet and outlet communicating with the cavity.

5. The valve system of claim 4, further comprising an inflow conduit communicating with the inlet of the valve member and an outflow conduit communicating with the outlet of the valve member, the inflow conduit and outflow conduit being in flow communication with a fluid coolant system of the engine so that engine coolant fluid flows into the cavity via the inflow conduit and the inlet and flows out of the cavity via the outlet and the outflow conduit.

6. The valve system of claim 5, further comprising a valve guide surrounding a portion of the valve member stem, the valve guide having a passage in flow communication with the inflow conduit, the outflow conduit, and the cavity of the valve member.

7. The valve system of claim 5, further comprising a coolant flow valve in the inflow conduit to control flow of engine coolant into the cavity.

8. The valve system of claim 7, further comprising a controller for controlling the coolant flow valve based on pressure of oil in the engine.

9. The valve system of claim 8, wherein the controller includes a case in flow communication with an oil lubrication system of the engine and a piston slidable in the case, an end of the piston being connected to the coolant flow valve so that pressure variation in the oil lubrication system moves the piston and coolant flow valve to control flow of engine coolant in the inflow conduit.

10. The valve system of claim 9, further comprising a spring biasing the piston to move the piston in response to reduced pressure in the oil lubrication system.

11. The valve system of claim 2, wherein the moving means is an expandable chamber containing a substance capable of changing size in response to a temperature variation.

12. The valve system of claim 2, wherein the moving means is a spring capable of changing size in response to a temperature variation.

13. The valve system of claim 1, further comprising means for controlling the moving means according to a operating speed of the engine.

14. The valve system of claim 1, further comprising a valve spring around the valve member stem to bias the valve member stem toward a camshaft of the engine.

15. The valve system of claim 1, wherein the valve member head includes an exterior groove, the sealing ring and moving means being disposed in the exterior groove.

* * * * *